(12) United States Patent
Pompeu

(10) Patent No.: US 10,927,755 B1
(45) Date of Patent: Feb. 23, 2021

(54) INTERNAL COMBUSTION ENGINE WITH VARIABLE COMPRESSION RATIO AND VARIABLE ENGINE DISPLACEMENT

(71) Applicant: Renato Cesar Pompeu, Cascavel (BR)

(72) Inventor: Renato Cesar Pompeu, Cascavel (BR)

( * ) Notice: Subject to any disclaimer, the term of this patent is extended or adjusted under 35 U.S.C. 154(b) by 0 days.

(21) Appl. No.: 16/663,402

(22) Filed: Oct. 25, 2019

(51) Int. Cl.
*F02B 75/04* (2006.01)
*F16H 19/08* (2006.01)
*F16H 1/28* (2006.01)
*F02D 15/02* (2006.01)

(52) U.S. Cl.
CPC ............ *F02B 75/047* (2013.01); *F02D 15/02* (2013.01); *F16H 1/28* (2013.01); *F16H 19/08* (2013.01)

(58) Field of Classification Search
CPC ........ F02B 75/047; F02D 15/02; F16H 19/08; F16H 1/28
See application file for complete search history.

(56) References Cited

U.S. PATENT DOCUMENTS

| | | | | |
|---|---|---|---|---|
| 2,897,804 A | * | 8/1959 | Crooks ................... | F02B 75/22 123/48 R |
| 4,738,230 A | * | 4/1988 | Johnson ................ | F02F 7/0019 123/48 B |
| 4,860,702 A | * | 8/1989 | Doundoulakis ....... | F02B 75/047 123/78 F |
| 5,158,047 A | * | 10/1992 | Schaal ..................... | F01B 9/02 123/197.4 |
| 5,170,757 A | * | 12/1992 | Gamache ................ | F02B 41/04 123/197.4 |
| 2011/0036334 A1 | * | 2/2011 | De Gooijer ........... | F02B 75/048 123/568.14 |
| 2017/0159560 A1 | * | 6/2017 | Fluhler ................... | F01B 9/042 |

FOREIGN PATENT DOCUMENTS

JP          2014034927 A   *   2/2014    ............... F16C 7/00

* cited by examiner

*Primary Examiner* — Hung Q Nguyen
(74) *Attorney, Agent, or Firm* — Houtteman Law LLC; Scott Houtteman

(57) ABSTRACT

A hypocycloidal internal combustion engine containing at least one alternative displacement piston connected through a connecting rod to a crankshaft, which is connected to an epicyclic gear train. In this gear train, the planet gear carrier is connected to the output shaft, and the ring gear can be rotated (in a controlled manner) in relation to the engine block. The present invention allows the control of the compression ratio and engine displacement of the engine by adjusting the angular position of the ring gear, which can be done continuously and instantaneously, even with the engine in operation.

1 Claim, 8 Drawing Sheets

INTERNAL COMBUSTION ENGINE WITH VARIABLE COMPRESSION RATIO AND VARIABLE ENGINE DISPLACEMENT

BACKGROUND OF THE INVENTION

This invention is on the mechanical engineering field and refers to an internal combustion engine with variable compression ratio and variable engine capacity. These two parameters can be controlled by modifying the angular position of a ring gear of an epicyclic gear train, which connects the engine piston to the output shaft. The innovative features allow the same engine to be utilized with several different fuels and operational conditions. Furthermore, the present invention shows advantages in relation to the conventional internal combustion engines, for instance the reduction of friction forces, lower temperatures in the cylinder and, consequently, higher durability.

Conventional internal combustion engines are based on an alternate displacement piston, transmitting its movement through a connecting rod to the crankshaft, converting the energy generated by the combustion to mechanical work. Nevertheless, this concept has several inconveniences, and several researches have been carried out seeking for higher efficiency, lower fuel consumption and lower greenhouse gas emissions.

One of these inconveniences is the angular movement of the connecting rod during the engine cycle, due to the connection of the linear displacement of the piston to the circular movement of the crankshaft. Therefore, a fraction of the piston force is decomposed on a force component that is perpendicular to the crankshaft rotation, thus reducing the force that is effectively transferred to the output shaft. Moreover, this lateral movement of the connecting rod leads to friction losses at the cylinder, generating heat between the piston and the cylinder and making the balancing and vibration mitigation of the system more difficult.

One alternative concept to the conventional internal combustion engine that minimizes these issues are the hypocycloidal engines. These engines connect the connecting rod to an epicyclic gearbox which transmits the power to the output shaft, eliminating the lateral movement of the connecting rod during the engine cycle. Several patents were published regarding epicyclic engines, for instance the following patents U.S. Pat. Nos. 9,540,994, 6,510,831, 5,067,456 and 4,026,252.

Another challenge to the conventional engines (also to the hypocycloidal engines presented until today) is the adaptation to different fuels. Each fuel demands a different compression ratio, usually around 9:1 for gasoline, 12:1 for ethanol and 18:1 for diesel (in some cases this ratio can go up to 25:1). There are multi-fuel engines which are built with an intermediate compression ratio, allowing the usage of different fuels, but not being the ideal condition for none of the fuels utilized. In that concept, the thermodynamic efficiency and the global efficiency are degraded. Consequently, there is an increase on the fuel consumption also on $CO_2$ emissions for the realization of the combustion cycle.

In that context, it is of great interest to have an engine capable of having a variable compression ratio. Several solutions are proposed by the following documents PI 0904015-3, BR 102013001074-0, PI0904014-5, U.S. Pat. Nos. 3,626,786, 4,887,560, 7,007,640, 9,540,932 and US 2008/0223320.

The present invention utilizes the benefits of the hypocycloidal engines and allows the control of the compression ratio and engine capacity, making it possible to tune the engine to maximize the efficiency on different fuels and operating conditions, constituting an innovative solution to the internal combustion engines.

SUMMARY OF THE INVENTION

The present invention refers to a hypocycloidal internal combustion engine containing at least one alternative displacement piston connected through a connecting rod to a crankshaft, which is connected to an epicyclic gear train. In this gear train, the planet gear carrier is connected to the output shaft, and the ring gear can be rotated (in a controlled manner) in relation to the engine block. Thus, the present invention, by controlling the angular position of the ring gear, allows the compression ratio and volumetric capacity to be modified in a continuous and instantaneous manner, even with the engine in operation. This is a novel solution for the internal combustion engines. Furthermore, the present invention can be applied in air compressors, hydraulic pumps, electric generators and other similar equipment.

DETAILED DESCRIPTION OF THE INVENTION

Figure 1:
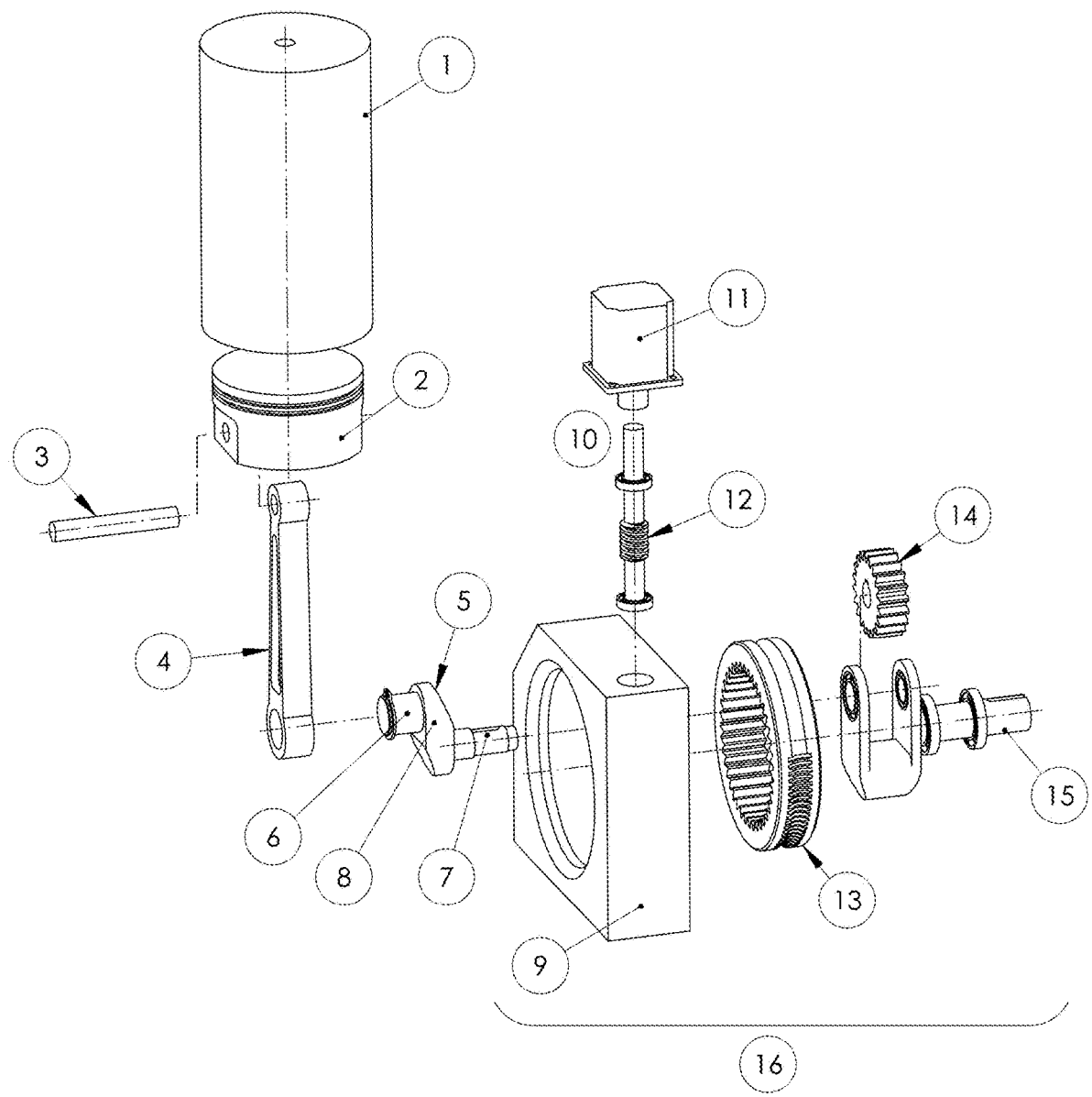
FIG. 1—shows the exploded view of the invention.

The present invention refers to a hypocycloidal internal combustion engine with variable compression ratio and variable cylinder capacity. The main components of this invention are illustrated on the FIG. 1 and FIG. 2. It is important to note that this invention can be presented in several variants which are discussed later.

In the present invention, a piston (2) inside the cylinder (1) is connected by a connecting rod (4) to the crankpin journal (6) of a crankshaft (5), whose main journal (7) is fixed concentrically to the planet gear (14) of an epicyclic gear train (16). This gear train also contains a ring gear (13), which can rotate (in a controlled manner) in relation to the engine block (9) and a main shaft (15) which carries the planet gears (14) (it can have one or more planet gears). Thus, the combustion energy at the cylinder (1) is transmitted to the piston (2) to the main shaft (15) through an epicyclic gear train (16). Also, there is a mechanism (10) capable to rotate the ring gear (13) in a controlled manner. This mechanism can be constituted of an auxiliary engine (11) that actuates an endless screw (12), which is connected to a quantity of external tooth at the ring gear (13). Thus, the system has only two degrees of freedom, one being the main shaft rotation (which determines the piston position) and the other being the angular position of the ring gear.

Figure 3:
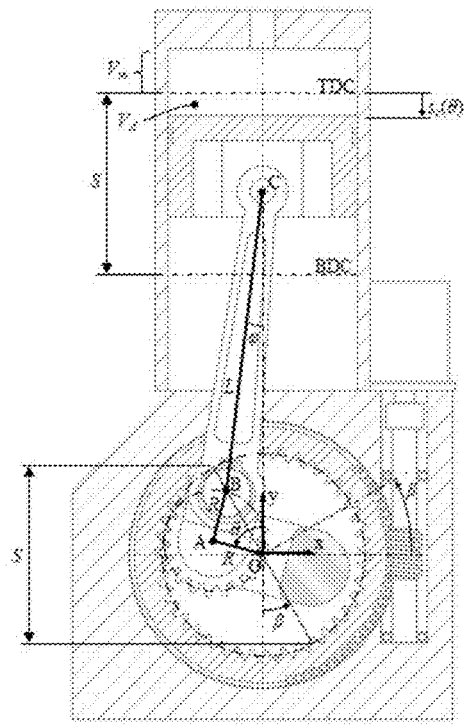
FIG. 3—shows the main components of the invention, represented as a three rod mechanism, where the point O is fixed to the origin, the rod OA (main shaft) can only rotate at the point O and the point C (piston) can only translate along the y-axis.

To support the kinematic analysis, the FIG. 3 shows the main components of the present invention, where the basic mechanism is represented by three rods (OA, AB, BC) on the x-y plane.

Figure 4:
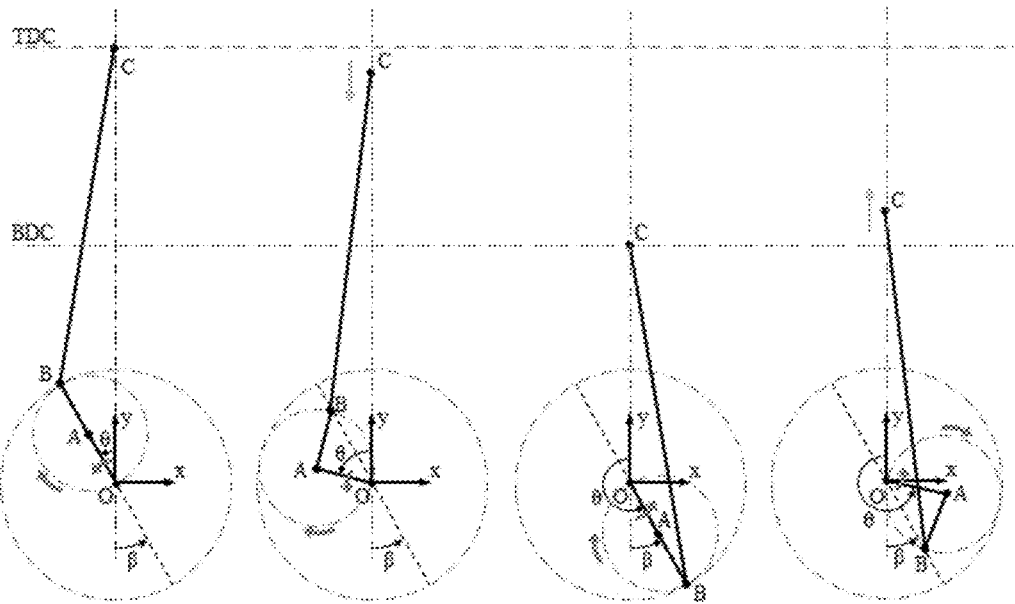
FIG. 4—shows the mechanism position at each stroke of the engine cycle.

The FIG. 4 illustrates different stages of the engine's cycle. The point O is fixed to the origin; the rod OA (main shaft) can only rotate around the point O; the point C (piston) can only translate along the y-axis.

It is noted that in FIG. 3 and FIG. 4, the rods OA and AB have length R, the satellite gear has primitive diameter 2R and the ring gear has primitive diameter 4R. This implies that the distance between the centre lines of the crankpin journal and the main journal (19, in FIG. 2) is equal to a half of the primitive diameter (18) of the planet gears. The primitive diameter (18) of the planet gears is equal to a half of the primitive diameter (17) of the ring gear. Consequently, the radial mounting position of a planet gear axis at the main shaft (planet carrier) must correspond to a half of the primitive diameter (18) of the planet gear.

Because of this configuration, the hypocycloid curve drawn by the point B is restricted to a straight-line segment that passes through the system origin (represented by the dashed line in FIG. 4). When β=0°, the point B draws a line collinear to the vertical axis. Consequently, the connecting rod (represented by BC) does not show any angular movement and the piston has maximum displacement. The maximum stroke of the piston is equal to the primitive diameter of the ring gear (4R). On the other hand, when the ring gear is positioned with an angle β>0°, as shown in FIG. 4, the point B draws a straight line that makes an angle β with the vertical axis. Consequently, the connecting rod has some angular movement during the engine cycle and the piston stroke is reduced (equal to 4R cos β).

Figure 2:
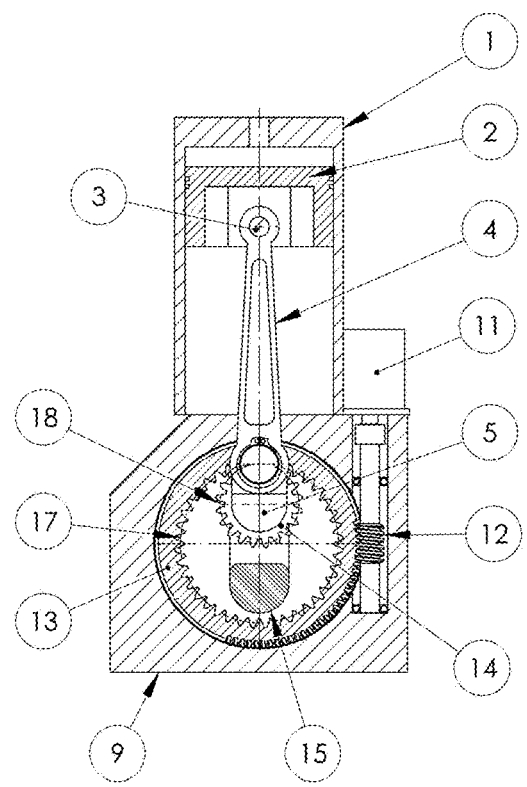
FIG. 2—shows the front section view of the invention.
Figure 2A:
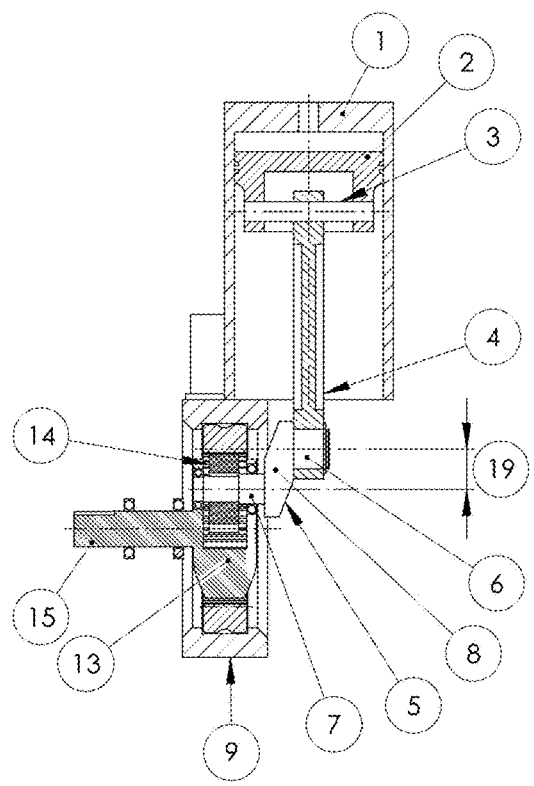
FIG. 2A—shows the lateral section view of the invention.

It is important to note that, for the correct operation of the system, the components must be initially assembled as shown in FIG. 2. The rods OA, AB and BC shown in FIG. 4 must be aligned to the vertical axis when β=0°. In the context of this invention, this configuration (when β=0°) is noted as "maximum compression ratio configuration". Similarly, the configuration when β=90° is noted as "minimum compression ratio configuration". Also, by convention, it is defined that the angular position (β) of the ring gear is positive when realized in the same direction as the main axis rotation, when the engine is in operation. These denominations are useful for the better understanding of the equations and plots described below.

Figure 5:
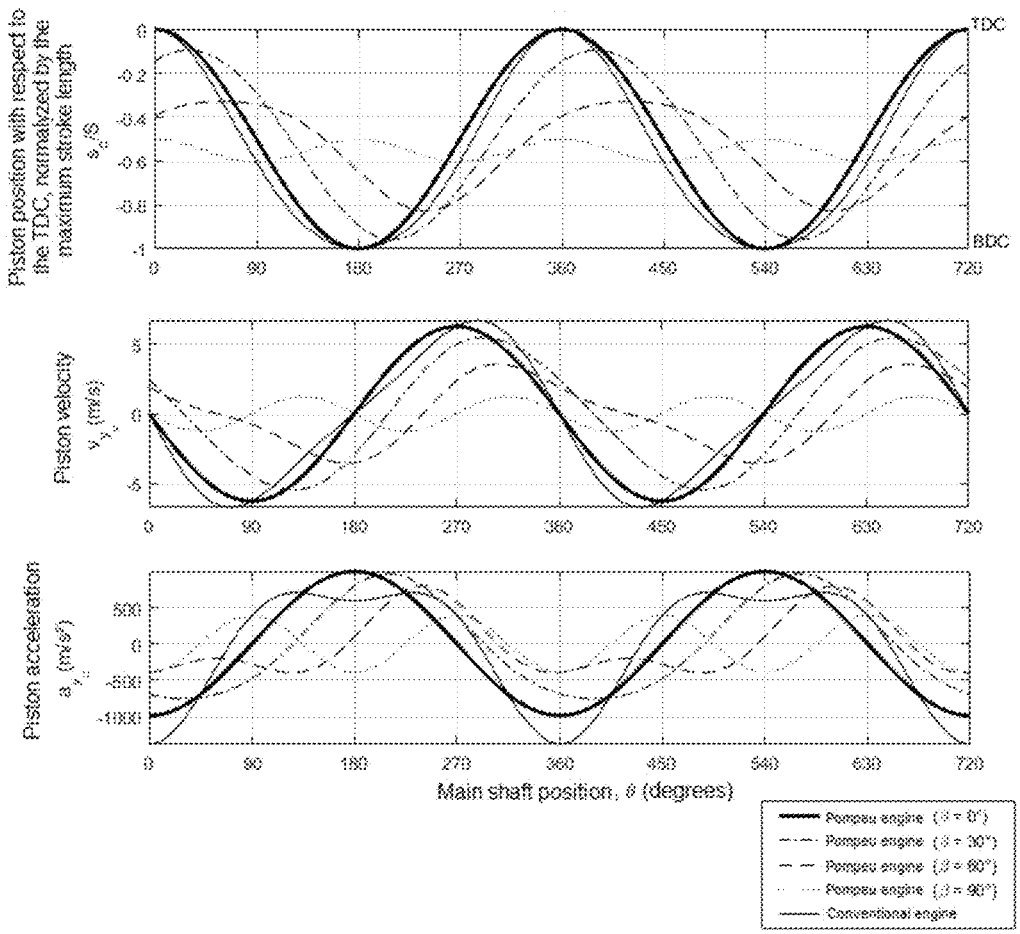
FIG. 5—shows the piston movement during the engine cycle, for different angular positions ($\beta$) of the ring gear.

The FIG. 5 shows the position, velocity and acceleration of the piston relative to the main shaft angular position (θ), for different ring gear angular positions (β). In this example, it is considered R=20 mm, L=100 mm and a constant main shaft speed of 1500 rpm. For comparison purposes, the position, velocity and acceleration of an equivalent conventional internal combustion engine are shown (identical piston maximum stroke, identical connecting rod length, crankshaft radius of 2R).

The position of the piston (point C) with respect to the origin, its velocity and its acceleration can be described by the equations (1), (2) and (3), respectively. the equation (4) describes the piston position with respect to the TDC (Top Dead Center).

$$y_c(\theta) = R\cos\theta + R\cos(\theta - 2\beta) + L\cos\varphi \quad (1)$$

$$v_{y_c}(\theta, \omega) = \quad (2)$$
$$\omega R[\sin(2\beta - \theta) - \sin\theta] - \frac{\omega R}{2n}\{[(\cos 2\beta - 1)^2 - (\sin 2\beta)^2](\sin\sin 2\theta) -$$
$$2(\cos\cos 2\beta - 1)(\sin\sin 2\beta)(\cos\cos 2\theta)\}, n = L/R$$

$$a_{y_c}(\theta, \omega) = -\omega^2 R[\cos(2\beta - \theta) + \cos\theta] - \quad (3)$$
$$\frac{\omega^2 R}{n}\{[(\cos 2\beta - 1)^2 - (\sin 2\beta)^2](\cos\cos 2\theta) +$$
$$2(\cos\cos 2\beta - 1)(\sin\sin 2\beta)(\cos\cos 2\theta)\}, n = L/R$$

$$s_c(\theta) = y_c - (L + 2R) \quad (4)$$

It is noted that the piston spends more time near the TDC when compared to the conventional combustion engine. This is advantageous when in the combustion stage, which gets closer to a constant volume process, contributing to increase the amount of work generated and the efficiency of the thermal cycle. It is important to note that, when the angular position (β) of the ring gear is modified, the TDC and BDC (Bottom Dead Center) are delayed by an angle β with respect to the main shaft, while the time period of the piston cycle is maintained.

In the configuration with β=0°, the maximum velocity of the piston is 6.4% lower than the conventional engine and the acceleration at TDC is 28.6% lower than the conventional engine.

Figure 6:
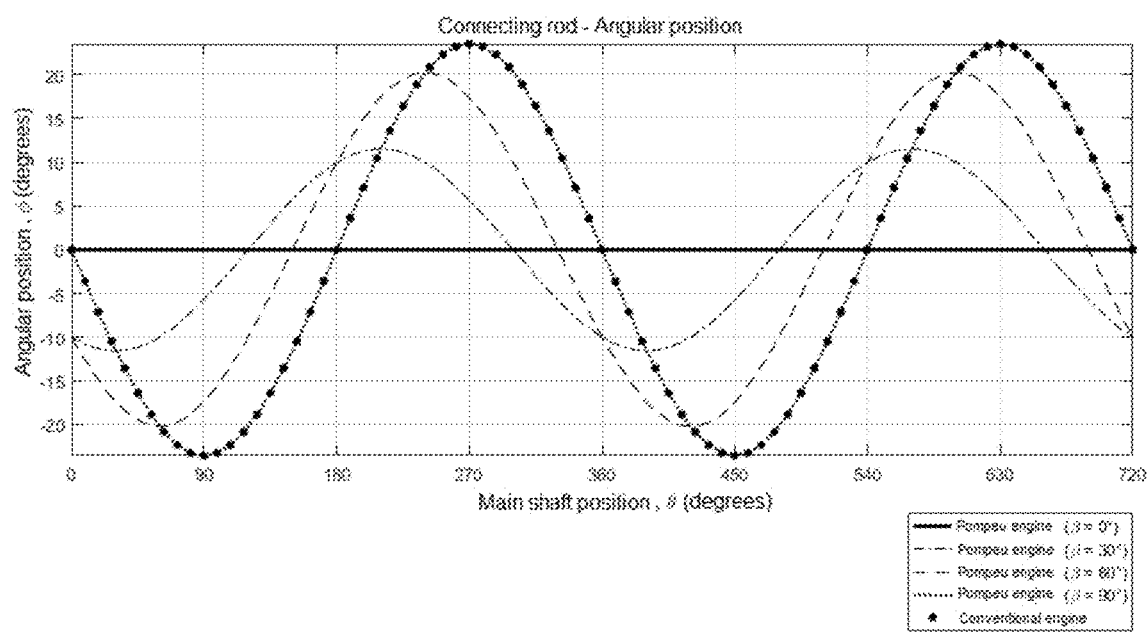
FIG. 6—shows the angular movement of the connecting rod during the engine cycle, for different angular positions ($\beta$) of the ring gear.
Figure 7:
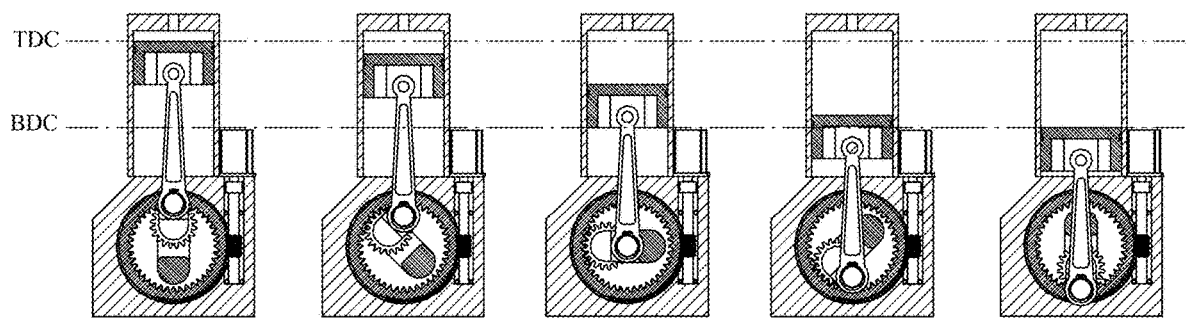
FIG. 7—illustrates the movement of the engine components at different stages of the engine cycle, when in the maximum compression ratio configuration (ring gear angular position is $\beta=0°$)

The FIG. 6 shows the angular position (φ) of the connecting rod when the ring gear is rotated by an angle β, as in equation (5). It is noticed that the connecting rod does not have any angular movement when β=0°, contributing to the mitigation of undesired lateral vibrations and lateral loads at the piston, thus reducing significantly the friction losses, heat generation and cylinder wear. This configuration is illustrated in FIG. 7.

As the angular position of the ring gear is modified (β>0°), the connecting rod shows certain angular movement during the cycle, although in a lesser magnitude than the angular movement seen in an equivalent conventional engine.

$$\varphi(\theta) = \left\{\frac{1}{n}[\sin\sin(\theta - 2\beta) - \sin\sin\theta]\right\}, \ n = L/R \quad (5)$$

Figure 8:
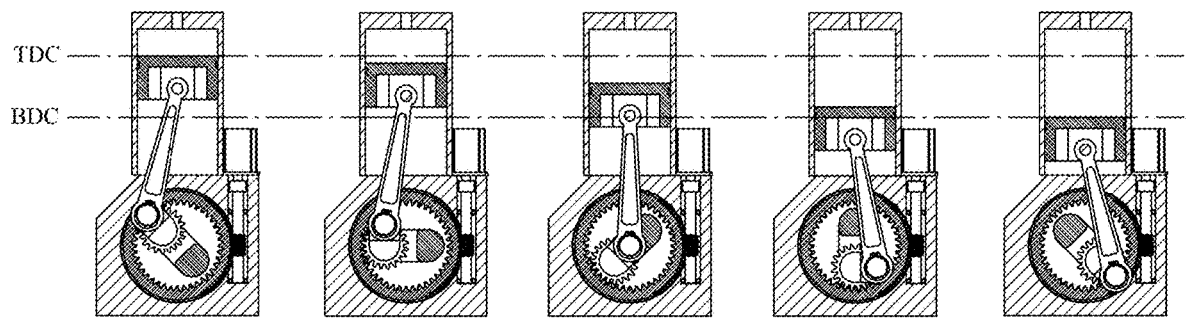
FIG. 8—illustrates the movement of the engine components at different stages of the engine cycle, when the ring gear angular position is $\beta=45°$.

FIG. 8 illustrates how the present invention behaves at an intermediate compression ratio configuration (β=45°). Comparing the FIG. 7 and FIG. 8, it is clear the modification of the movement of the piston (TDC and BDC positions, for instance) and of the movement of the connecting rod, by the change in the ring gear position.

Figure 9:
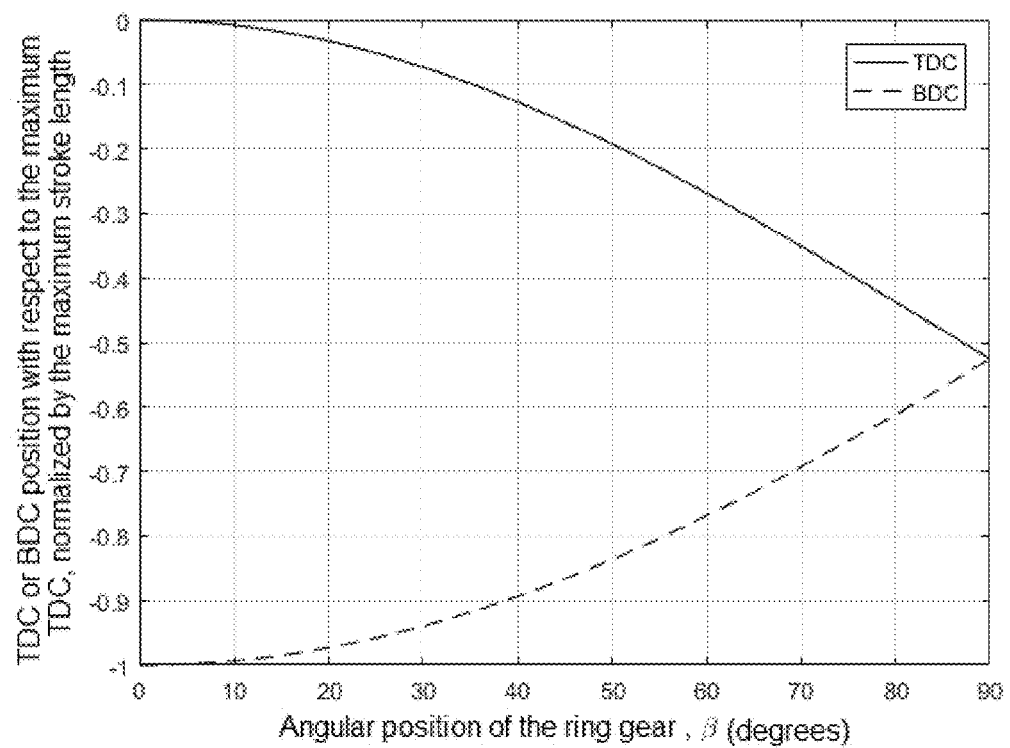
FIG. 9—shows the TDC and BDC positions for different angular positions ($\beta$) of the ring gear.

The TDC and BDC positions are determined by the ring gear angular position (β) and can be obtained by the equations (6) and (7). The FIG. 9 shows these positions for 0°≤β≤90°. The equation (8) describes the piston stroke length, being the distance between TDC and BDC. The equation (9) represents the angular position (φ) of the connecting rod when the piston is at TDC (or BDC).

$$TDC = L\cos\varphi_{TDC} + 2R\cos\beta \quad (6)$$

$$BDC = L\cos\varphi_{BDC} - 2R\cos\beta \quad (7)$$

$$S = TDC - BDC = 4R\cos\beta \quad (8)$$

$$\varphi_{TDC} = -\varphi_{BDC} = \left(-\frac{R}{L}\sin\beta\right) \quad (9)$$

The engine displacement, clearance volume and compression ratio can be calculated by the equations (10), (11) and (13). Given an engine with maximum compression ratio (given by $tc_0$) and a piston of diameter d, the maximum engine displacement is $V_{d_0}=4R\pi d$, and the respective clearance volume ($V_{m_0}$) can be obtained by the equation (12).

$$V_d = \pi d(TDC - BDC) = 4R\pi d\cos\beta \quad (10)$$

$$V_m = V_{m_0} + \pi d(L + 2R - TDC) \quad (11)$$

$$V_{m_0} = \frac{V_{d_0}}{(tc_o - 1)} \quad (12)$$

$$tc = \frac{V_d + V_m}{V_m} \quad (13)$$

Figure 10:
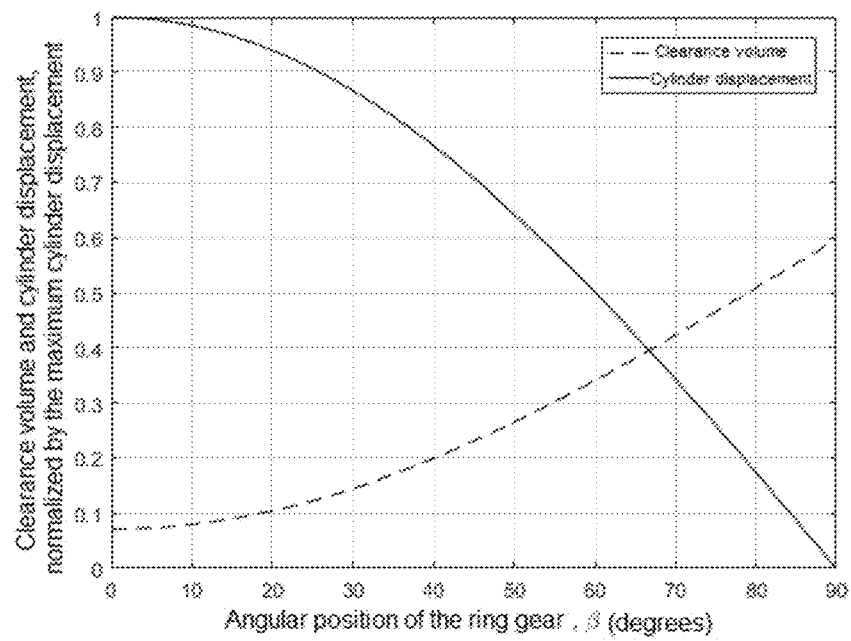
FIG. 10—shows the clearance volume and engine displacement for different angular positions ($\beta$) of the ring gear (for an engine with maximum compression ratio of 15:1)
Figure 11:
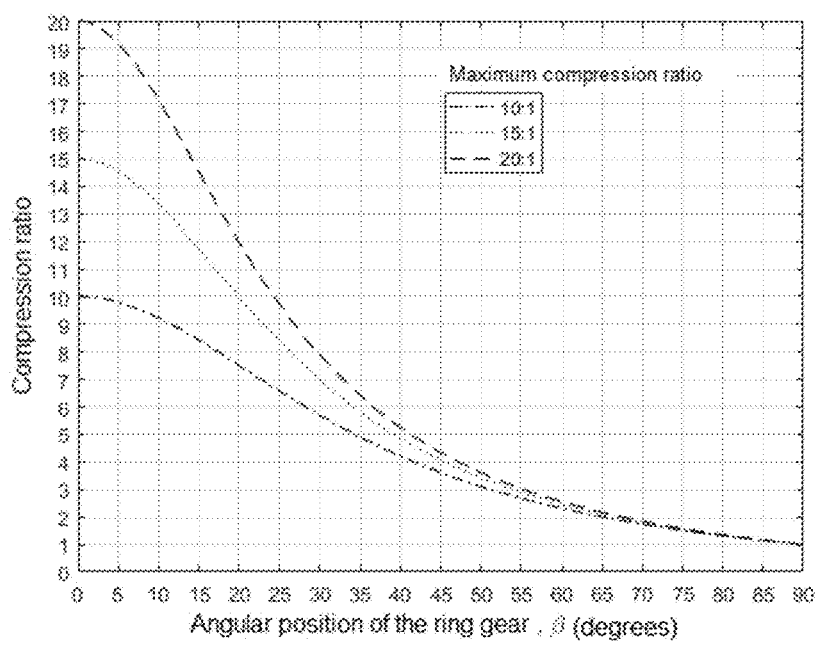
FIG. 11—shows the compression ratio for different angular positions ($\beta$) of the ring gear (three curves are displayed, for engines built as described by this invention but with different maximum compression ratios of 20:1, 15:1 and 10:1)
Figure 12:
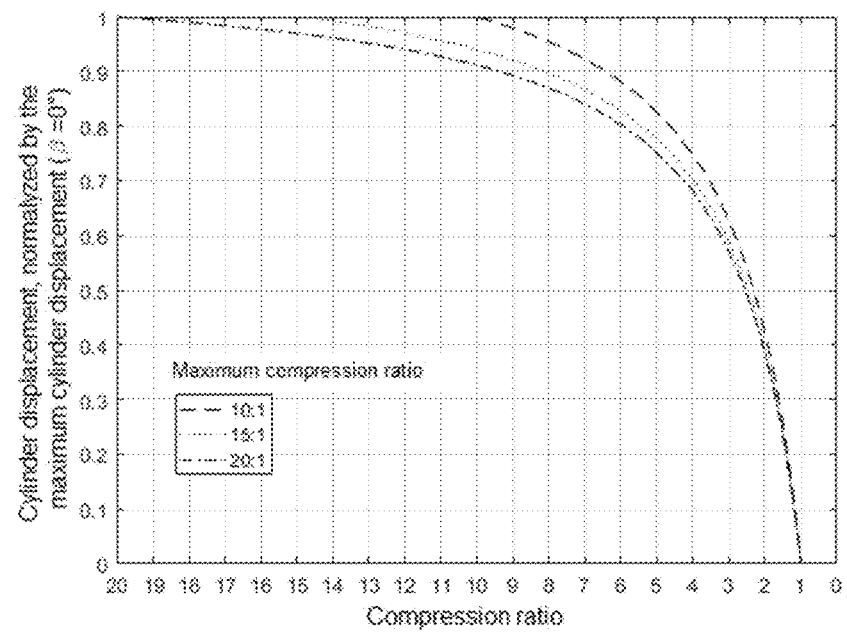
FIG. 12—show modification of the engine displacement with the compression ratio (three curves are displayed, for engines built as described by this invention but with different maximum compression ratios of 20:1, 15:1 and 10:1)

Then, starting with β=0°, as the ring gear is rotated, the TDC and BDC positions are modified (FIG. 9) in such a way that the engine displacement is reduced, and the clearance volume is increased (FIG. 10). Therefore, it is obtained a modification of the compression ratio, as shown in FIG. 11 and FIG. 12. FIG. 12 shows the compression ratio curves for engines built as in the present invention, but with maximum compression ratios of 20:1, 15:1 and 10:1.

Thus, the present invention allows the control of the compression ratio and engine displacement of the engine by adjusting the angular position of the ring gear, which can be done continuously and instantaneously, even with the engine in operation.

Figure 13:
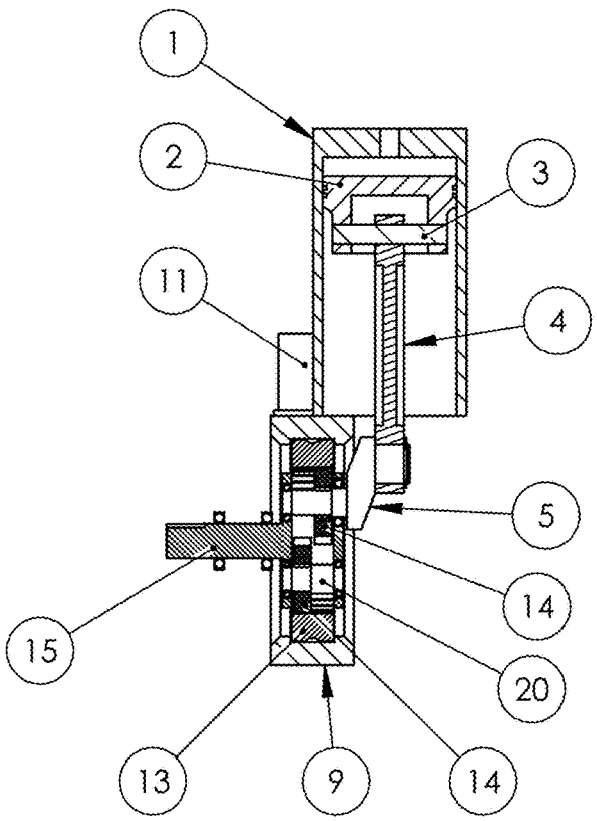
FIG. 13—illustrates a variant of the present invention with more than one planet gear in the epicyclic gearbox.
Figure 13A:
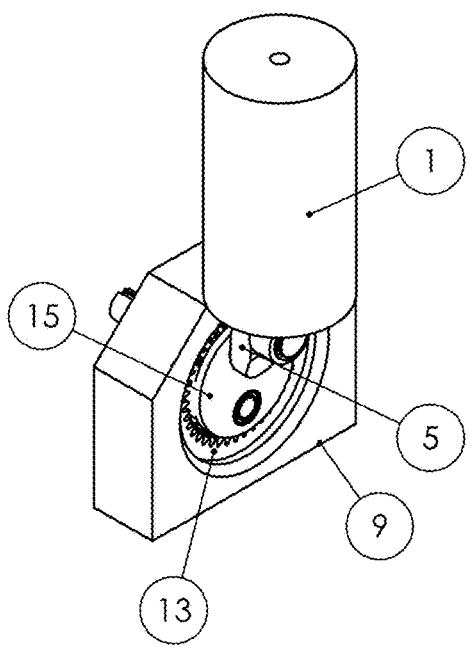
FIG. 13A—illustrates a detailed view of the variant of the present invention with more than one planet gear in the epicyclic gearbox.
Figure 14:
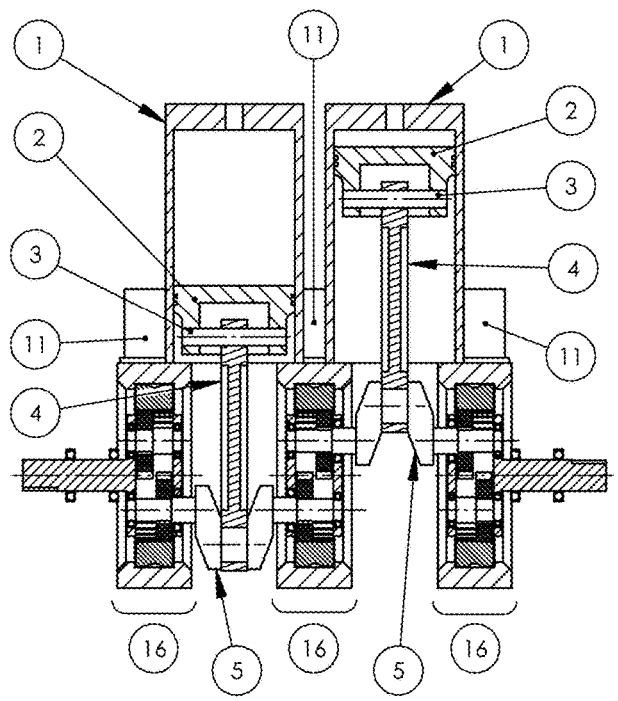
FIG. 14—illustrates a multi-cylinder variant of the present invention, where each cylinder is connected to a crankshaft, which is connected to two epicyclic gearboxes.
Figure 14A:
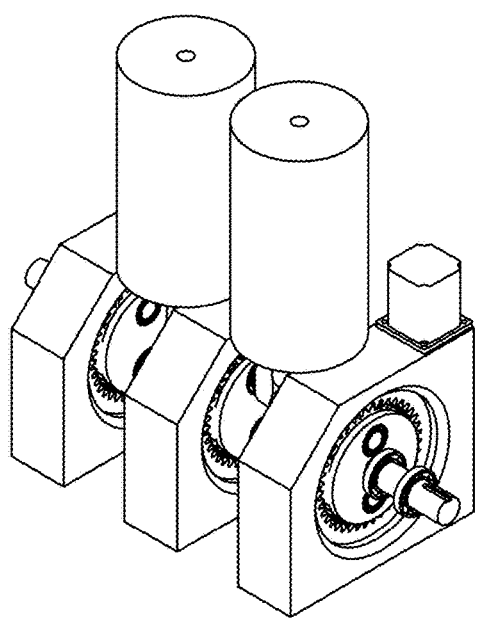
FIG. 14A—illustrates a detailed view of the multi-cylinder variant of the present invention, where each cylinder is connected to a crankshaft, which is connected to two epicyclic gearboxes.

The engine presented here can be designed in several configurations, containing more than one cylinder in different layouts. Some of these variations are exemplified by the FIGS. 13 and 14. The FIG. 13 shows a variant with more than one satellite gear on the epicyclic gearbox, reducing the loads at the gears. The FIG. 14 shows a multi-cylinder variant, where each crankshaft is connected to two epicyclic gearboxes. Moreover, its concept can be extended to compressors, pumps, generators and similar equipment.

The invention claimed is:

1. A variable compression ratio internal combustion engine comprising:
    a cylinder, a piston, a connecting rod, a ring gear, a planet gear, an endless screw and a crankshaft;
    wherein said ring gear comprises a plurality of internal teeth and a plurality of external teeth;
    the piston, connected by the connecting rod to the planet gear, which, in turn, is connected to the crankshaft, the planet gear is configured to engage the plurality of internal teeth of the ring gear and to travel around an inside of the ring gear, the plurality of external teeth of the ring gear is configured to engage the endless screw; wherein the endless screw is configured to rotate the ring gear in a controlled manner through a plurality of angular positions, β;
    said piston is configured to travel inside said cylinder between a top dead center position and a bottom dead center position as the crankshaft rotates; and
    said endless screw alters the angular position of the ring gear, which, in turn, alters an angular position of the planet gear when the piston is at said top dead center position and at said bottom dead center position as follows:
        to allow the piston reach its maximum top dead center position, the planet gear can be at β=0 when the crankshaft is at β=0 and to allow the piston to reach its minimum bottom dead center position, the planet gear can be at β=180 when the crankshaft is at β=180, and
        to restrict the piston from reaching its maximum top dead center position, the planet gear can be positioned at β>0 when the crankshaft is at β=0 and to restrict the piston from reaching its minimum bottom dead center position, the ring gear can be positioned at β>180 when the crankshaft is at β=180;
    wherein this variable positioning of the ring gear via the endless screw allows for the compression ratio to be continuously varied in response to engine operating conditions.

* * * * *